US011436579B2

(12) United States Patent
Hall et al.

(10) Patent No.: US 11,436,579 B2
(45) Date of Patent: Sep. 6, 2022

(54) PERFORMING ENHANCED DEPOSIT ITEM PROCESSING USING COGNITIVE AUTOMATION TOOLS

(71) Applicant: Bank of America Corporation, Charlotte, NC (US)

(72) Inventors: Barry Hall, Charlotte, NC (US); Adam Desautels, Charlotte, NC (US); Verlon S. Watson, Charlotte, NC (US); Letishia R. Hunt, Charlotte, NC (US); Brendan P. Murphy, Charlotte, NC (US); Charles Christopher Harbinson, Mooresville, NC (US)

(73) Assignee: Bank of America Corporation, Charlotte, NC (US)

(*) Notice: Subject to any disclaimer, the term of this patent is extended or adjusted under 35 U.S.C. 154(b) by 43 days.

(21) Appl. No.: 16/865,759

(22) Filed: May 4, 2020

(65) Prior Publication Data

US 2021/0342798 A1    Nov. 4, 2021

(51) Int. Cl.
*G06Q 20/10* (2012.01)
*G06F 16/55* (2019.01)
(Continued)

(52) U.S. Cl.
CPC ......... *G06Q 20/1085* (2013.01); *G06F 16/55* (2019.01); *G06F 40/205* (2020.01); *G06K 9/6256* (2013.01); *G06K 9/6267* (2013.01); *G06N 5/04* (2013.01); *G06N 20/00* (2019.01); *G06Q 20/042* (2013.01);
(Continued)

(58) Field of Classification Search
USPC .......................................................... 705/43
See application file for complete search history.

(56) References Cited

U.S. PATENT DOCUMENTS 5,349,170 A * 9/1994 Kern .................... G06Q 20/042
705/45
5,630,073 A * 5/1997 Nolan .................... G06Q 40/02
705/45
(Continued)

OTHER PUBLICATIONS

Credit Card Fraud Detection Using Learning to Rank Approach IEEE (Year: 2018).*
(Continued)

*Primary Examiner* — Bruce I Ebersman
(74) *Attorney, Agent, or Firm* — Banner & Witcoff, Ltd.

(57) ABSTRACT

Aspects of the disclosure relate to performing enhanced deposit item processing using cognitive automation tools. In some embodiments, a computing platform may receive, from a deposit item input support server, image data associated with a deposit item. Subsequently, the computing platform may apply a machine learning classification model to the image data associated with the deposit item. In doing so, the computing platform may produce one or more predicted values for one or more fields of the deposit item and one or more confidence scores for the one or more predicted values. Based on these predicted values and confidence scores, the computing platform may generate and send one or more commands directing the deposit item input support server to accept or reject the deposit item, which in turn may cause the deposit item input support server to accept or reject the deposit item.

17 Claims, 7 Drawing Sheets

(51) Int. Cl.
    *G06Q 30/00* (2012.01)
    *G06Q 40/02* (2012.01)
    *G06Q 20/04* (2012.01)
    *G06N 20/00* (2019.01)
    *G06F 40/205* (2020.01)
    *G06K 9/62* (2022.01)
    *G06N 5/04* (2006.01)
    *G06V 30/226* (2022.01)
    *G06V 30/224* (2022.01)
    *G06V 30/10* (2022.01)

(52) U.S. Cl.
    CPC ......... *G06Q 30/0185* (2013.01); *G06Q 40/02* (2013.01); *G06V 30/226* (2022.01); *G06V 30/2253* (2022.01); *G06V 30/10* (2022.01)

(56) References Cited

U.S. PATENT DOCUMENTS

| | | | | |
|---|---|---|---|---|
| 5,937,084 | A * | 8/1999 | Crabtree | G06V 10/22 382/137 |
| 7,130,807 | B1 * | 10/2006 | Mikurak | G06Q 30/0202 705/7.31 |
| 7,181,430 | B1 * | 2/2007 | Buchanan | G06Q 40/00 705/16 |
| 7,257,246 | B1 * | 8/2007 | Brodie | G06Q 20/042 705/40 |
| 7,991,696 | B2 * | 8/2011 | Gustin | G06Q 20/1085 235/379 |
| 8,437,530 | B1 * | 5/2013 | Mennie | G06Q 20/108 235/379 |
| 8,944,234 | B1 * | 2/2015 | Csulits | G07D 7/12 382/140 |
| 2006/0106717 | A1 * | 5/2006 | Randle | G06Q 20/12 705/45 |
| 2014/0270464 | A1 * | 9/2014 | Nepomniachtchi | G06V 10/993 382/137 |
| 2015/0026060 | A1 * | 1/2015 | Krietzman | G06Q 20/3221 705/44 |
| 2019/0087942 | A1 * | 3/2019 | Ma | G06T 7/50 |
| 2020/0126514 | A1 | 4/2020 | Kim | |
| 2020/0126645 | A1 | 4/2020 | Robbins et al. | |
| 2020/0126654 | A1 | 4/2020 | Holmes et al. | |
| 2020/0126657 | A1 | 4/2020 | Chakrabarti et al. | |
| 2020/0126660 | A1 | 4/2020 | Costantino et al. | |
| 2020/0126663 | A1 | 4/2020 | Lucas et al. | |
| 2020/0126664 | A1 | 4/2020 | Sato | |
| 2020/0126740 | A1 | 4/2020 | Pizzato | |
| 2020/0126756 | A1 | 4/2020 | Franco et al. | |
| 2020/0126872 | A1 | 4/2020 | Van Leest et al. | |
| 2020/0127451 | A1 | 4/2020 | Elberbaum | |
| 2020/0127661 | A1 | 4/2020 | Pizzato | |
| 2020/0127714 | A1 | 4/2020 | Murakami et al. | |
| 2020/0127812 | A1 | 4/2020 | Schuler et al. | |
| 2020/0127826 | A1 | 4/2020 | Ebrahimi et al. | |
| 2020/0127832 | A1 | 4/2020 | Ebrahimi | |
| 2020/0127891 | A9 | 4/2020 | Johnson et al. | |
| 2020/0127961 | A1 | 4/2020 | Saxena | |
| 2020/0127985 | A1 | 4/2020 | Isaacson et al. | |
| 2020/0128007 | A1 | 4/2020 | Connell, II et al. | |
| 2020/0128036 | A1 | 4/2020 | Saizynski et al. | |
| 2020/0128047 | A1 | 4/2020 | Biswas et al. | |
| 2020/0128054 | A1 | 4/2020 | Miller | |
| 2020/0128173 | A1 | 4/2020 | Lee et al. | |
| 2020/0128230 | A1 | 4/2020 | Shikata et al. | |
| 2020/0128271 | A1 | 4/2020 | Tanner | |
| 2020/0128307 | A1 | 4/2020 | Li | |
| 2020/0128342 | A1 | 4/2020 | Hoorzad et al. | |
| 2020/0128395 | A1 | 4/2020 | Mars et al. | |
| 2020/0128396 | A1 | 4/2020 | Mars et al. | |
| 2020/0128418 | A1 | 4/2020 | Dzierwa et al. | |
| 2020/0394763 | A1 * | 12/2020 | Ma | G06T 5/002 |
| 2021/0090086 | A1 * | 3/2021 | Kriegsfeld | G06Q 20/4016 |

OTHER PUBLICATIONS

"Doing good by fighting fraud: Ethical anti-fraud systems for mobile payments" Cornell University (Year: 2021).*
Method and System for Validating Information (Year: 2010).*
System and Method of data access for credit scores (Year: 2015).*
Parts of a Check (Year: 2020).*
Justin Pritchard et al:"Parts of a Check What the Numbers Mean" Nov. 25, 2021(Nov. 25, 2021).

* cited by examiner

PERFORMING ENHANCED DEPOSIT ITEM PROCESSING USING COGNITIVE AUTOMATION TOOLS

BACKGROUND

Aspects of the disclosure relate to data processing systems, machine learning, and cognitive automation. In particular, one or more aspects of the disclosure relate to performing enhanced deposit item processing using cognitive automation tools.

A financial institution may configure and deploy various enterprise computer systems to receive and process cash, checks, and other items that may be presented for deposit by customers and others. In some instances in which deposit items are presented electronically (e.g., as check images), these enterprise computer systems may use different hardware and software tools to validate and process the deposit items. Conventional hardware and software tools used in processing deposit items may have various limitations, however, including limited accuracy and speed at which they can process such items.

SUMMARY

Aspects of the disclosure provide effective, efficient, scalable, and convenient technical solutions that address and overcome the technical problems associated with processing deposit items. In particular, one or more aspects of the disclosure use cognitive automation tools to perform enhanced deposit item processing.

In accordance with one or more embodiments, a computing platform having at least one processor, a communication interface, and memory may receive, via the communication interface, from a first deposit item input support server, first image data associated with a first deposit item. Subsequently, the computing platform may apply a machine learning classification model to the first image data associated with the first deposit item. In addition, by applying the machine learning classification model to the first image data associated with the first deposit item, the computing platform may produce one or more predicted values for one or more fields of the first deposit item and one or more confidence scores for the one or more predicted values. Based on the one or more predicted values for the one or more fields of the first deposit item and the one or more confidence scores for the one or more predicted values, the computing platform may generate one or more commands directing the first deposit item input support server to accept or reject the first deposit item. Then, the computing platform may send, via the communication interface, to the first deposit item input support server, the one or more commands directing the first deposit item input support server to accept or reject the first deposit item. Additionally, by sending the one or more commands directing the first deposit item input support server to accept or reject the first deposit item, the computing platform may cause the first deposit item input support server to accept or reject the first deposit item.

In some embodiments, receiving the first image data associated with the first deposit item from the first deposit item input support server may include receiving the first image data associated with the first deposit item from the first deposit item input support server in real time as the first deposit item is presented for deposit.

In some embodiments, receiving the first image data associated with the first deposit item from the first deposit item input support server may include receiving image data comprising handwritten text. In some embodiments, receiving the first image data associated with the first deposit item from the first deposit item input support server may include parsing the handwritten text using one or more computer vision models.

In some embodiments, applying the machine learning classification model to the first image data associated with the first deposit item may produce a predicted value for a legal amount of the first deposit item and a confidence score for the predicted value for the legal amount of the first deposit item. In some embodiments, applying the machine learning classification model to the first image data associated with the first deposit item may produce a predicted value for a convenience box amount of the first deposit item and a confidence score for the predicted value for the convenience box amount of the first deposit item.

In some embodiments, applying the machine learning classification model to the first image data associated with the first deposit item may produce a predicted value for a payee field of the first deposit item. In some embodiments, applying the machine learning classification model to the first image data associated with the first deposit item may produce a predicted value for a date field of the first deposit item. In some embodiments, applying the machine learning classification model to the first image data associated with the first deposit item may produce a predicted value for a signature field of the first deposit item. In some embodiments, applying the machine learning classification model to the first image data associated with the first deposit item may produce a predicted value for an endorsement field of the first deposit item. In some embodiments, applying the machine learning classification model to the first image data associated with the first deposit item may produce a predicted value for a magnetic ink character recognition (MICR) line field of the first deposit item.

In some embodiments, generating the one or more commands directing the first deposit item input support server to accept or reject the first deposit item may include: generating a valid-invalid decision for the first deposit item based on the one or more confidence scores for the one or more predicted values and one or more confidence thresholds corresponding to the one or more predicted values; and embedding the valid-invalid decision generated for the first deposit item in the one or more commands directing the first deposit item input support server to accept or reject the first deposit item. In addition, the valid-invalid decision generated for the first deposit item may cause the first deposit item input support server to accept the first deposit item if the valid-invalid decision generated for the first deposit item includes an indication that the first deposit item is validly presented for deposit, and the valid-invalid decision generated for the first deposit item causes the first deposit item input support server to reject the first deposit item if the valid-invalid decision generated for the first deposit item includes an indication that the first deposit item is not validly presented for deposit.

In some embodiments, prior to receiving the first image data associated with the first deposit item, the computing platform may train the machine learning classification model based on a labeled dataset comprising images of previously submitted deposit items and decision data corresponding to the images of the previously submitted deposit items indicating whether each of the previously submitted deposit items was validly presented for deposit or not validly presented for deposit.

In some embodiments, after sending the one or more commands directing the first deposit item input support server to accept or reject the first deposit item, the computing platform may receive, via the communication interface, from an enterprise user computing device, key input indicating one or more actual values for the one or more fields of the first deposit item. Subsequently, the computing platform may update the machine learning classification model based on the key input indicating the one or more actual values for the one or more fields of the first deposit item.

In some embodiments, the computing platform may receive, via the communication interface, from a second deposit item input support server, second image data associated with a second deposit item, where the second deposit item input support server processes deposit items presented for deposit via a different channel than the first deposit item input support server. Subsequently, the computing platform may apply the machine learning classification model to the second image data associated with the second deposit item, and applying the machine learning classification model to the second image data associated with the second deposit item may produce one or more predicted values for one or more fields of the second deposit item and one or more confidence scores for the one or more predicted values of the one or more fields of the second deposit item. Based on the one or more predicted values for the one or more fields of the second deposit item and the one or more confidence scores for the one or more predicted values of the one or more fields of the second deposit item, the computing platform may generate one or more commands directing the second deposit item input support server to accept or reject the second deposit item. Then, the computing platform may send, via the communication interface, to the second deposit item input support server, the one or more commands directing the second deposit item input support server to accept or reject the second deposit item. In addition, sending the one or more commands directing the second deposit item input support server to accept or reject the second deposit item may cause the second deposit item input support server to accept or reject the second deposit item.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
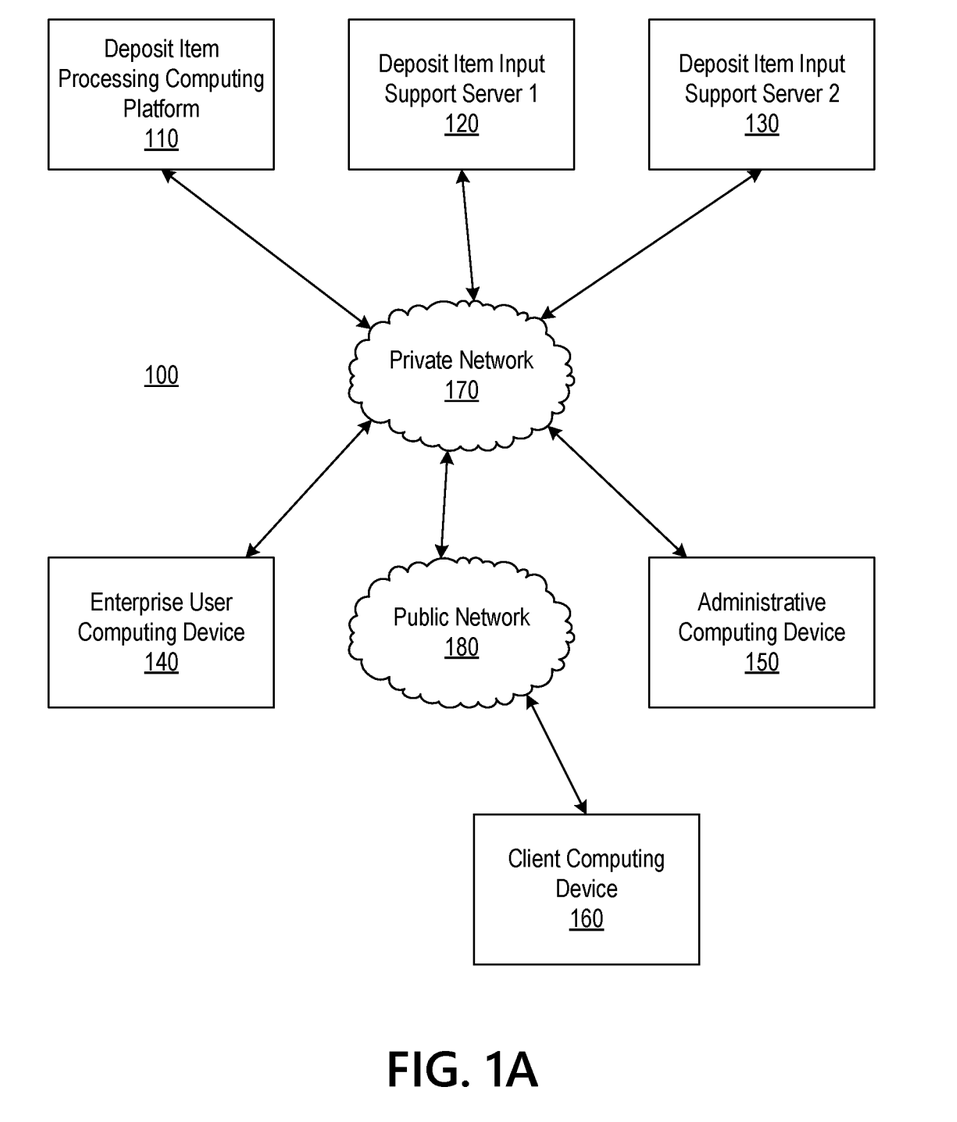
FIGS. 1A and 1B depict an illustrative computing environment for performing enhanced deposit item processing using cognitive automation tools in accordance with one or more example embodiments.
Figure 1B:
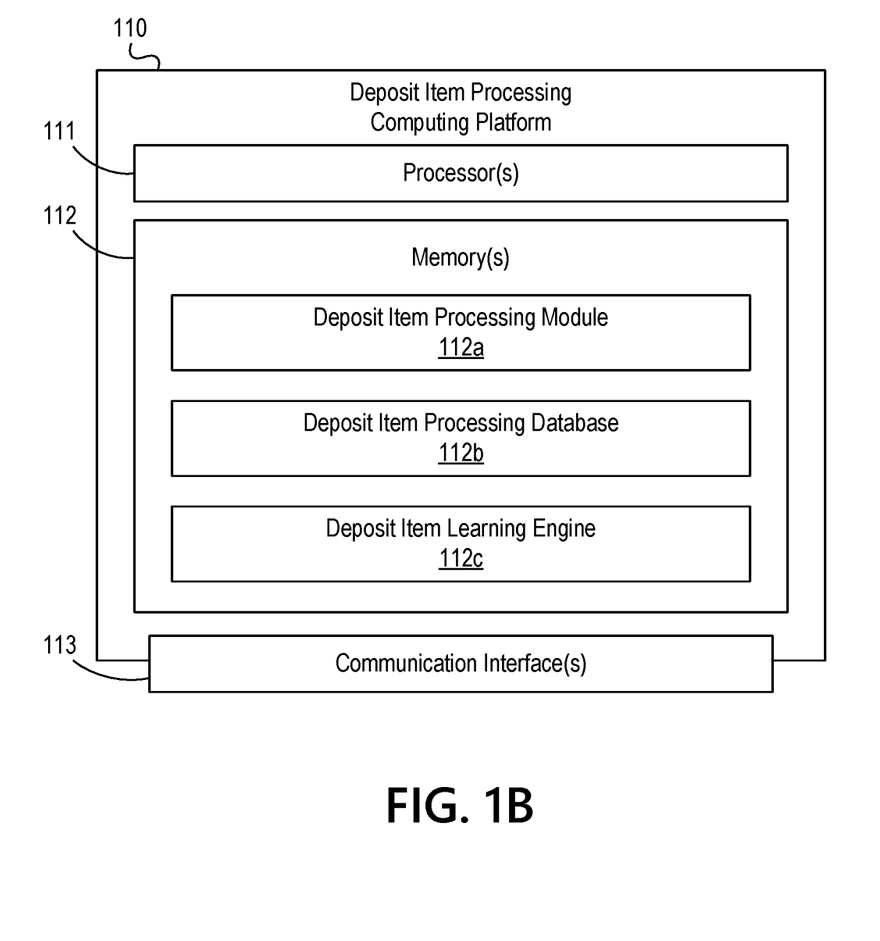

FIGS. 1A and 1B depict an illustrative computing environment for performing enhanced deposit item processing using cognitive automation tools in accordance with one or more example embodiments. Referring to FIG. 1A, computing environment 100 may include one or more computer systems. For example, computing environment 100 may include a deposit item processing computing platform 110, a first deposit item input support server 120, a second deposit item input support server 130, an enterprise user computing device 140, an administrative computing device 150, and a client computing device 160.

As illustrated in greater detail below, deposit item processing computing platform 110 may include one or more computing devices configured to perform one or more of the functions described herein. For example, deposit item processing computing platform 110 may include one or more computers (e.g., laptop computers, desktop computers, servers, server blades, or the like).

Deposit item input support server 120 may include one or more computing devices and/or other computer components (e.g., processors, memories, communication interfaces). In addition, and as illustrated in greater detail below, deposit item input support server 120 may be configured to interact with and/or otherwise communicate with one or more computing devices and/or other devices (e.g., automated teller machines (ATMs), automated teller assistants (ATAs), customer computing devices, financial center computing devices, and/or the like) which may receive and/or process deposit items being presented for deposit at various locations and/or via various channels (e.g., via an ATM/ATA channel, via a financial center channel, via an online banking channel, via a mobile banking channel, and/or the like).

Deposit item input support server 130 also may include one or more computing devices and/or other computer components (e.g., processors, memories, communication interfaces). In addition, and as illustrated in greater detail below, deposit item input support server 130 may be configured to interact with and/or otherwise communicate with one or more computing devices and/or other devices (e.g., automated teller machines (ATMs), automated teller assistants (ATAs), customer computing devices, financial center computing devices, and/or the like) which may receive and/or process deposit items being presented for deposit at various locations and/or via various channels (e.g., via an ATM/ATA channel, via a financial center channel, via an online banking channel, via a mobile banking channel, and/or the like). In some instances, deposit item input support server 130 may be configured to process deposit items received via one or more channels different from the one or more channels for which deposit item input support server 120 may process deposit items.

Enterprise user computing device 140 may be a personal computing device (e.g., desktop computer, laptop computer) or mobile computing device (e.g., smartphone, tablet). In addition, enterprise user computing device 140 may be linked to and/or used by an enterprise user (who may, e.g., be an employee of a financial institution operating deposit item processing computing platform 110). For instance, enterprise user computing device 140 may be used by an enterprise associate who assists customers in a financial center operated by the financial institution operating deposit item processing computing platform 110.

Administrative computing device 150 also may be a personal computing device (e.g., desktop computer, laptop computer) or mobile computing device (e.g., smartphone, tablet). In addition, administrative computing device 150 may be linked to and/or used by an enterprise user (who may, e.g., be an employee of a financial institution operating deposit item processing computing platform 110). For instance, administrative computing device 150 may be used by a network administrator or backend enterprise user who monitors and/or configures deposit item processing computing platform 110 and/or other enterprise computing devices.

Client computing device 160 may be a personal computing device (e.g., desktop computer, laptop computer) or mobile computing device (e.g., smartphone, tablet). In addition, client computing device 160 may be linked to and/or used by a specific non-enterprise user (who may, e.g., be a customer of a financial institution operating deposit item processing computing platform 110). For instance, client computing device 160 may be used by a customer who presents one or more deposit items for deposit with the financial institution operating deposit item processing computing platform 110.

Computing environment 100 also may include one or more networks, which may interconnect one or more of deposit item processing computing platform 110, deposit item input support server 120, deposit item input support server 130, enterprise user computing device 140, administrative computing device 150, and client computing device 160. For example, computing environment 100 may include a private network 170 (which may, e.g., interconnect deposit item processing computing platform 110, deposit item input support server 120, deposit item input support server 130, enterprise user computing device 140, administrative computing device 150, and/or one or more other systems which may be associated with an organization, such as a financial institution) and public network 180 (which may, e.g., interconnect client computing device 160 with private network 170 and/or one or more other systems, public networks, sub-networks, and/or the like).

In one or more arrangements, deposit item input support server 120, deposit item input support server 130, enterprise user computing device 140, administrative computing device 150, client computing device 160, and/or the other systems included in computing environment 100 may be any type of computing device capable of receiving a user interface, receiving input via the user interface, and communicating the received input to one or more other computing devices. For example, deposit item input support server 120, deposit item input support server 130, enterprise user computing device 140, administrative computing device 150, client computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of deposit item processing computing platform 110, deposit item input support server 120, deposit item input support server 130, enterprise user computing device 140, administrative computing device 150, and client computing device 160 may, in some instances, be special-purpose computing devices configured to perform specific functions.

Referring to FIG. 1B, deposit item processing computing platform 110 may include one or more processor(s) 111, memory(s) 112, and communication interface(s) 113. A data bus may interconnect processor 111, memory 112, and communication interface 113. Communication interface 113 may be a network interface configured to support communication between deposit item processing computing platform 110 and one or more networks (e.g., network 170, network 180, or the like). Memory 112 may include one or more program modules and/or processing engines having instructions that when executed by processor 111 cause deposit item processing computing platform 110 to perform one or more functions described herein and/or one or more databases that may store and/or otherwise maintain information which may be used by such program modules, processing engines, and/or processor 111. In some instances, the one or more program modules, processing engines, and/or databases may be stored by and/or maintained in different memory units of deposit item processing computing platform 110 and/or by different computing devices that may form and/or otherwise make up deposit item processing computing platform 110. For example, memory 112 may have, store, and/or include a deposit item processing module 112a, a deposit item processing database 112b, and a deposit item learning engine 112c.

Deposit item processing module 112a may have instructions that direct and/or cause deposit item processing computing platform 110 to perform enhanced deposit item processing using cognitive automation tools, as discussed in greater detail below. Deposit item processing database 112b may store information used by deposit item processing computing platform 110 in performing enhanced deposit item processing using cognitive automation tools. Deposit item learning engine 112c may perform and/or provide one or more cognitive automation and/or machine learning functions and/or services, as illustrated in greater detail below.

Figure 2A:
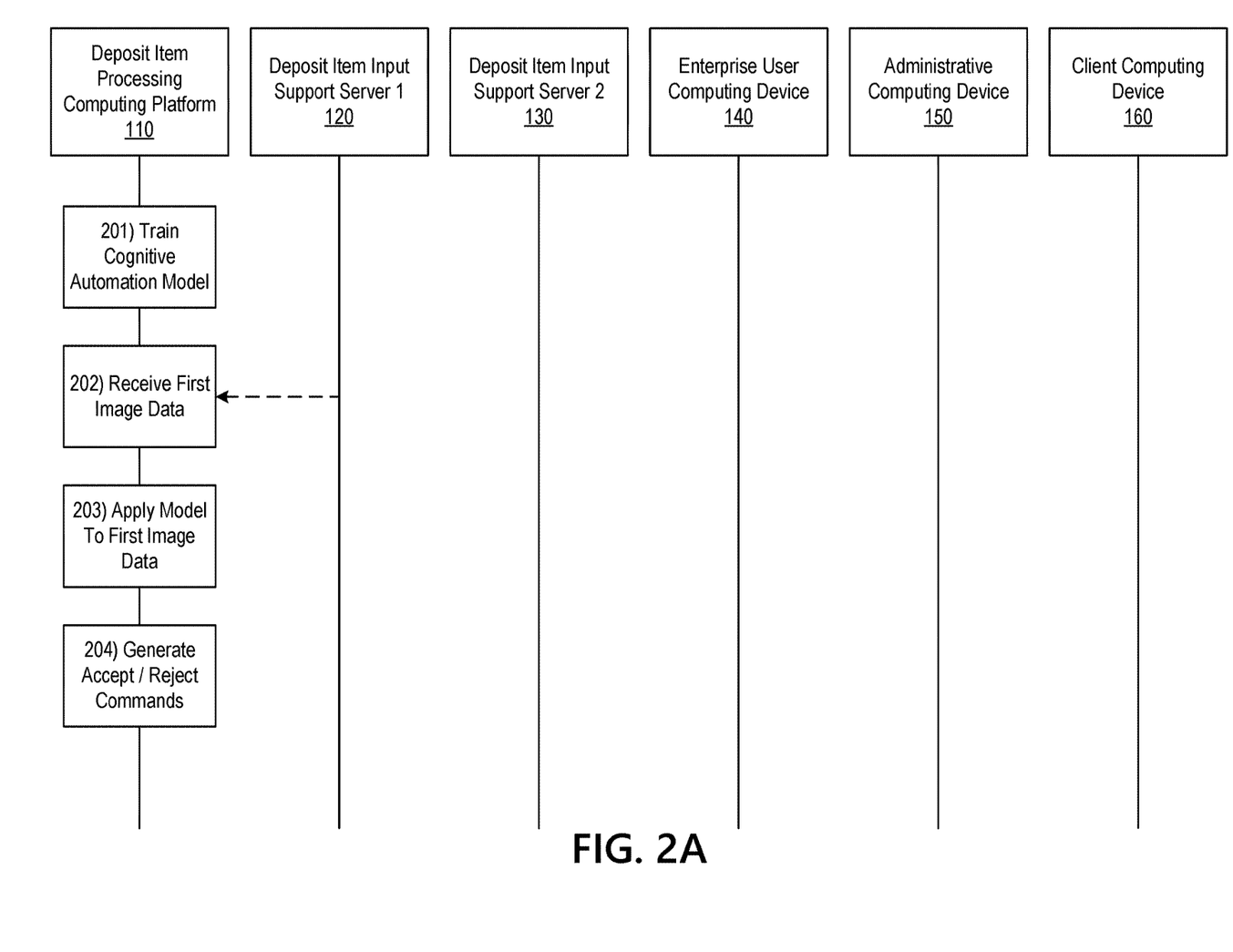
FIGS. 2A-2C depict an illustrative event sequence for performing enhanced deposit item processing using cognitive automation tools in accordance with one or more example embodiments.
Figure 2B:
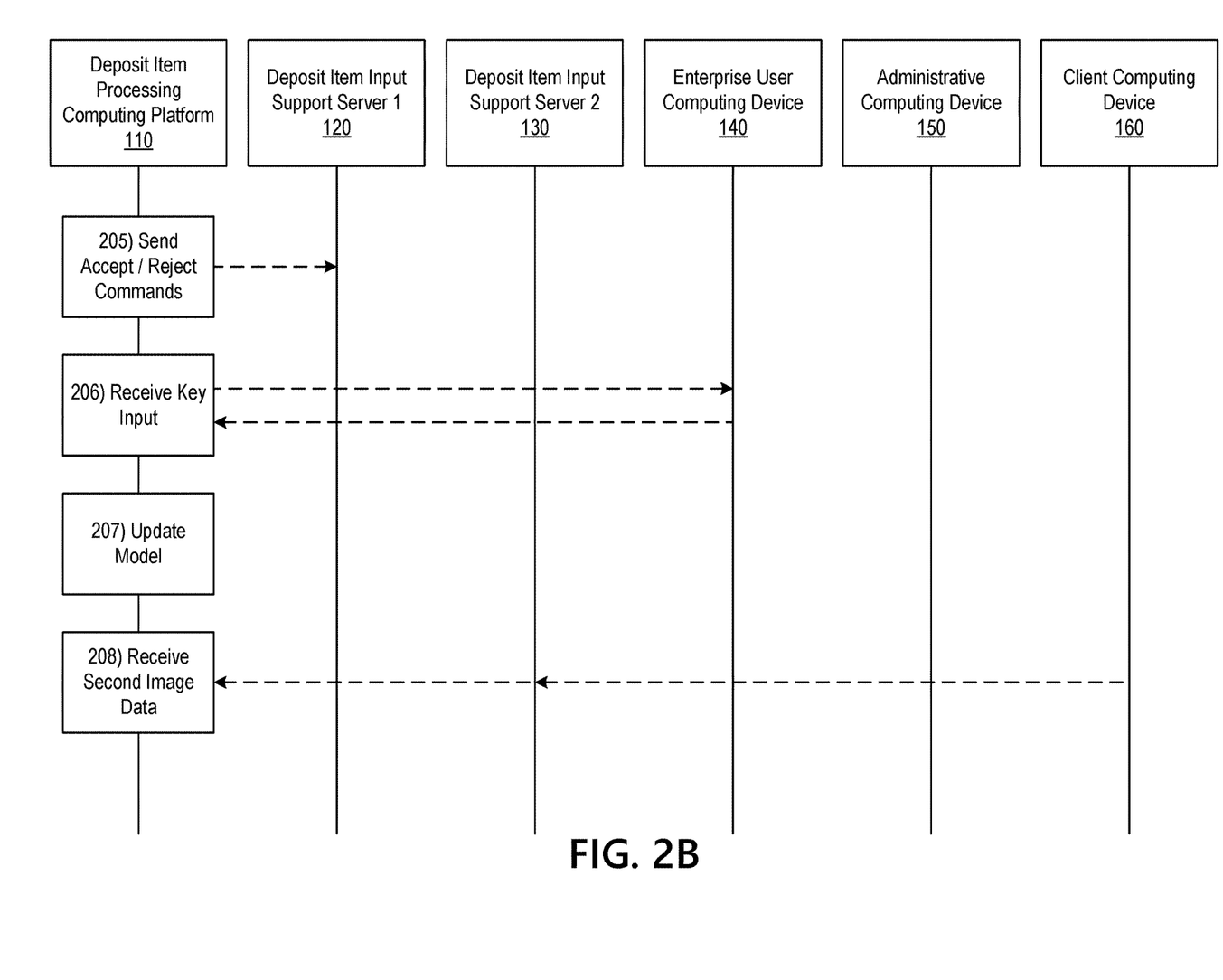
Figure 2C:
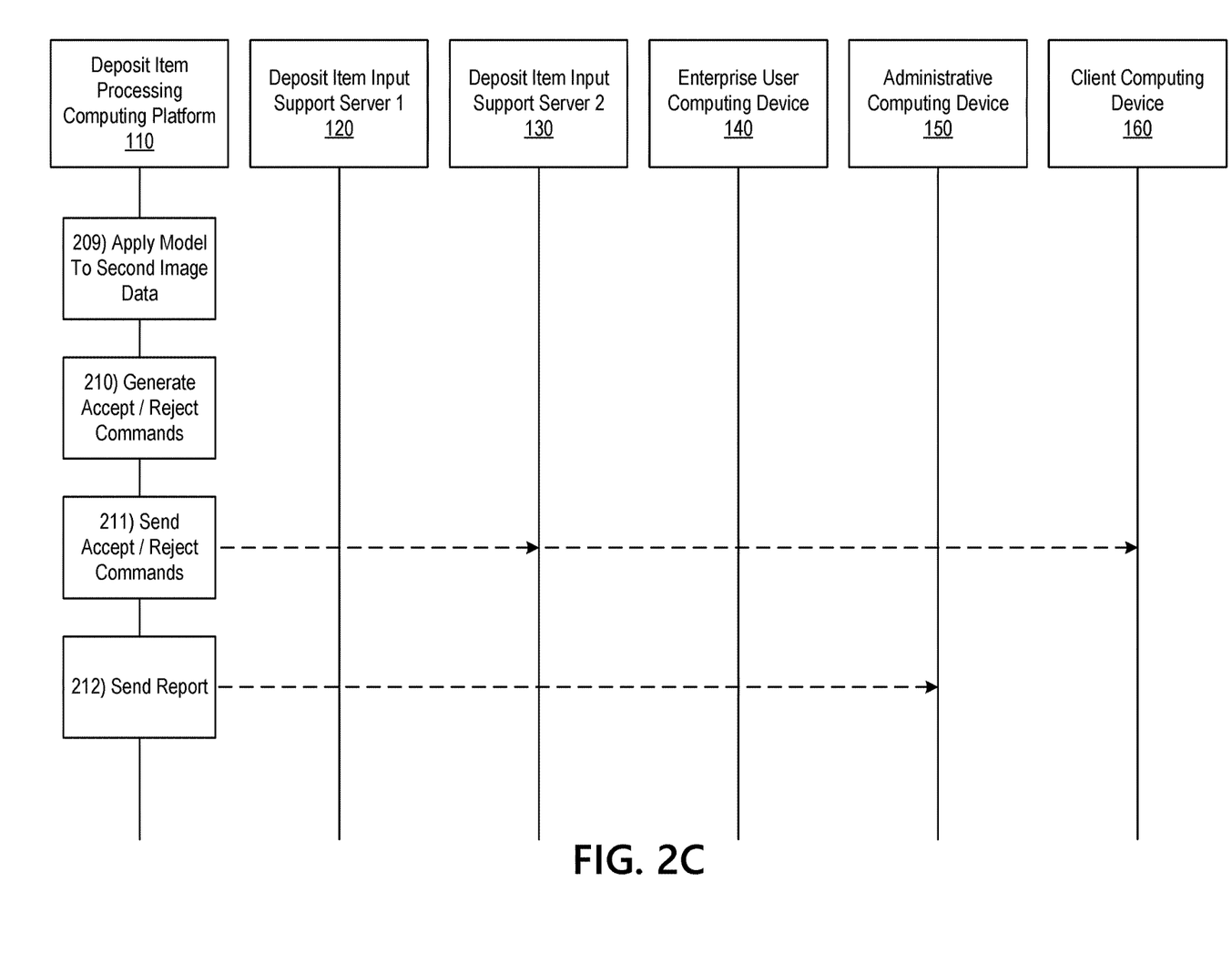

FIGS. 2A-2C depict an illustrative event sequence for performing enhanced deposit item processing using cognitive automation tools in accordance with one or more example embodiments. Referring to FIG. 2A, at step 201, deposit item processing computing platform 110 may train a cognitive automation model. For example, at step 201, deposit item processing computing platform 110 may train a machine learning classification model based on a labeled dataset comprising images of previously submitted deposit items and decision data corresponding to the images of the previously submitted deposit items indicating whether each of the previously submitted deposit items was validly presented for deposit or not validly presented for deposit. The machine learning classification model may, for instance, be a cognitive automation model that relies on advanced learning sub-models, artificial intelligence algorithms, and/or neural networks. The images of previously submitted deposit items and the decision data corresponding to the images of the previously submitted deposit items indicating whether each of the previously submitted deposit items was validly presented for deposit or not validly presented for deposit may, for instance, be received from one or more deposit item support servers (e.g., deposit item input support server 120, deposit item input support server 130), loaded by a user of administrative computing device 150, and/or received from other enterprise data stores associated with a financial institution operating deposit item processing computing platform 110.

At step 202, deposit item processing computing platform 110 may receive first image data from deposit item input support server 120. For example, at step 202, deposit item processing computing platform 110 may receive, via the communication interface (e.g., communication interface 113), from a first deposit item input support server (e.g., deposit item input support server 120), first image data associated with a first deposit item (e.g., a personal check, a cashier's check, a money order, a business check, and/or the like).]

In some embodiments, receiving the first image data associated with the first deposit item from the first deposit item input support server may include receiving the first image data associated with the first deposit item from the first deposit item input support server in real time as the first deposit item is presented for deposit. For example, in receiving the first image data associated with the first deposit item from the first deposit item input support server (e.g., deposit item input support server 120) at step 202, deposit item processing computing platform 110 may receive the first image data associated with the first deposit item from the first deposit item input support server (e.g., deposit item input support server 120) in real time as the first deposit item is presented for deposit. For instance, deposit item processing computing platform 110 may receive the first image data associated with the first deposit item from deposit item input support server 120 in real time as the first deposit item is presented for deposit at an ATM, ATA, financial center, mobile device, or the like. As discussed above, deposit item input support server 120 may be connected to and/or communicate with such an ATM, ATA, financial center, mobile device, or the like, and by receiving this image data in real time, deposit item processing computing platform 110 may use the cognitive automation model to quickly make a decision on whether to accept or reject the deposit item and return the decision to the person attempting the deposit item, which may be provide various advantages over conventional deposit approaches and technology.

In some embodiments, receiving the first image data associated with the first deposit item from the first deposit item input support server may include receiving image data comprising handwritten text. For example, in receiving the first image data associated with the first deposit item from the first deposit item input support server (e.g., deposit item input support server 120) at step 202, deposit item processing computing platform 110 may receive image data comprising handwritten text. For instance, the first deposit item may include handwritten text and the first image data associated with the first deposit item received from the first deposit item input support server (e.g., deposit item input support server 120) may include such handwritten text. As illustrated in greater detail below, deposit item processing computing platform 110 may read and/or otherwise analyze such text in processing the first deposit item.

In some embodiments, receiving the first image data associated with the first deposit item from the first deposit item input support server may include parsing the handwritten text using one or more computer vision models. For example, in receiving the first image data associated with the first deposit item from the first deposit item input support server (e.g., deposit item input support server 120), deposit item processing computing platform 110 may parse the handwritten text using one or more computer vision models. For instance, deposit item processing computing platform 110 may parse the handwritten text using one or more computer vision models to recognize alphanumeric text and/or other content printed on one or more sides of the first deposit item. Such computer vision modes may, for instance, be trained and/or otherwise created on deposit item processing computing platform 110 to recognize unique features of handwriting and/or other text when it appears on deposit items.

At step 203, deposit item processing computing platform 110 may apply the cognitive automation model to the first image data received from deposit item input support server 120. For example, at step 203, deposit item processing computing platform 110 may apply a machine learning classification model to the first image data associated with the first deposit item. In addition, in applying the machine learning classification model to the first image data associated with the first deposit item at step 203, deposit item processing computing platform 110 may produce one or more predicted values for one or more fields of the first deposit item and one or more confidence scores for the one or more predicted values. The one or more predicted values for one or more fields of the first deposit item may, for instance, include alphanumeric content generated by deposit item processing computing platform 110 using the cognitive automation model, and the one or more confidence scores for the one or more predicted values may, for instance, be numeric scores representing the quantitative degree of confidence in the prediction(s) as calculated by deposit item processing computing platform 110 in applying the cognitive automation model (e.g., based on one or more distance values from one or more previous and/or labeled values to one or more corresponding actual and/or encountered values).

In some embodiments, applying the machine learning classification model to the first image data associated with the first deposit item may produce a predicted value for a legal amount of the first deposit item and a confidence score for the predicted value for the legal amount of the first deposit item. For example, in applying the machine learning classification model to the first image data associated with the first deposit item at step 203, deposit item processing computing platform 110 may produce a predicted value for a legal amount of the first deposit item and a confidence score for the predicted value for the legal amount of the first deposit item. The predicted value for the legal amount may, for instance, correspond to a prediction and/or machine reading of handwritten text expressing the amount of the deposit item (e.g., the check) in words and/or phrases (e.g., in non-numerical form).

In some embodiments, applying the machine learning classification model to the first image data associated with the first deposit item may produce a predicted value for a convenience box amount of the first deposit item and a confidence score for the predicted value for the convenience box amount of the first deposit item. For example, in applying the machine learning classification model to the first image data associated with the first deposit item at step 203, deposit item processing computing platform 110 may produce a predicted value for a convenience box amount of the first deposit item and a confidence score for the predicted value for the convenience box amount of the first deposit item. The predicted value for the convenience box amount may, for instance, correspond to a prediction and/or machine reading of handwritten text expressing the amount of the deposit item (e.g., the check) in numbers (e.g., in numerical-only form).

In some embodiments, applying the machine learning classification model to the first image data associated with the first deposit item may produce a predicted value for a payee field of the first deposit item. For example, in applying the machine learning classification model to the first image data associated with the first deposit item at step 203, deposit item processing computing platform 110 may produce a predicted value for a payee field of the first deposit item. The predicted value for the payee field may, for instance, correspond to a prediction and/or machine reading of handwritten text identifying a recipient of the deposit item.

In some embodiments, applying the machine learning classification model to the first image data associated with the first deposit item may produce a predicted value for a date field of the first deposit item. For example, in applying the machine learning classification model to the first image data associated with the first deposit item at step 203, deposit item processing computing platform 110 may produce a predicted value for a date field of the first deposit item.

In some embodiments, applying the machine learning classification model to the first image data associated with the first deposit item may produce a predicted value for a signature field of the first deposit item. For example, in applying the machine learning classification model to the first image data associated with the first deposit item at step 203, deposit item processing computing platform 110 may produce a predicted value for a signature field of the first deposit item. In some instances, the predicted value for the signature field of the first deposit item may, for instance, correspond to a prediction of whether or not the deposit item includes a signature (e.g., on a signature line of the deposit item and/or elsewhere on a face of the deposit item).

In some embodiments, applying the machine learning classification model to the first image data associated with the first deposit item may produce a predicted value for an endorsement field of the first deposit item. For example, in applying the machine learning classification model to the first image data associated with the first deposit item at step 203, deposit item processing computing platform 110 may produce a predicted value for an endorsement field of the first deposit item. In some instances, the predicted value for the endorsement field of the first deposit item may, for instance, correspond to a prediction of whether or not the deposit item includes an endorsement (e.g., on an endorsement signature line of the deposit item and/or elsewhere on a face of the deposit item). In some instances, this predicted value may be particularly useful, as deposit items that do not include such endorsements may be rejected downstream (e.g., and thus it may be beneficial to detect and reject such non-endorsed deposit items in real time, at the time of deposit, so as to provide real time feedback to a customer attempting to deposit such an item and to reduce the burden on downstream processing systems and/or software).

In some embodiments, applying the machine learning classification model to the first image data associated with the first deposit item may produce a predicted value for a magnetic ink character recognition (MICR) line field of the first deposit item. For example, in applying the machine learning classification model to the first image data associated with the first deposit item at step 203, deposit item processing computing platform 110 may produce a predicted value for a magnetic ink character recognition (MICR) line field of the first deposit item.

At step 204, deposit item processing computing platform 110 may generate one or more commands directing deposit item input support server 120 to accept or reject the first deposit item. For example, at step 204, based on the one or more predicted values for the one or more fields of the first deposit item and the one or more confidence scores for the one or more predicted values, deposit item processing computing platform 110 may generate one or more commands directing the first deposit item input support server (e.g., deposit item input support server 120) to accept or reject the first deposit item.

In some embodiments, in generating the one or more commands directing the first deposit item input support server (e.g., deposit item input support server 120) to accept or reject the first deposit item at step 204, deposit item processing computing platform 110 may generate a valid-invalid decision for the first deposit item based on the one or more confidence scores for the one or more predicted values and one or more confidence thresholds corresponding to the one or more predicted values. For instance, if the one or more confidence scores for the one or more predicted values exceed the one or more confidence thresholds corresponding to the one or more predicted values, deposit item processing computing platform 110 may generate a decision indicating that the one or more predicted values are valid. If not, deposit item processing computing platform 110 may generate a decision indicating that the one or more predicted values are not valid. Subsequently, deposit item processing computing platform 110 may embed the valid-invalid decision generated for the first deposit item in the one or more commands directing the first deposit item input support server (e.g., deposit item input support server 120) to accept or reject the first deposit item. In addition, the valid-invalid decision generated for the first deposit item may cause the first deposit item input support server (e.g., deposit item input support server 120) to accept the first deposit item if the valid-invalid decision generated for the first deposit item comprises an indication that the first deposit item is validly presented for deposit. Alternatively, the valid-invalid decision generated for the first deposit item may cause the first deposit item input support server (e.g., deposit item input support server 120) to reject the first deposit item if the valid-invalid decision generated for the first deposit item comprises an indication that the first deposit item is not validly presented for deposit.

Referring to FIG. 2B, at step 205, deposit item processing computing platform 110 may send the one or more commands to deposit item input support server 120. For example, at step 205, deposit item processing computing platform 110 may send, via the communication interface (e.g., communication interface 113), to the first deposit item input support server (e.g., deposit item input support server 120), the one or more commands directing the first deposit item input support server (e.g., deposit item input support server 120) to accept or reject the first deposit item. In addition, by sending the one or more commands directing the first deposit item input support server (e.g., deposit item input support server 120) to accept or reject the first deposit item, deposit item processing computing platform 110 may cause the first deposit item input support server (e.g., deposit item input support server 120) to accept or reject the first deposit item.

Figure 3:
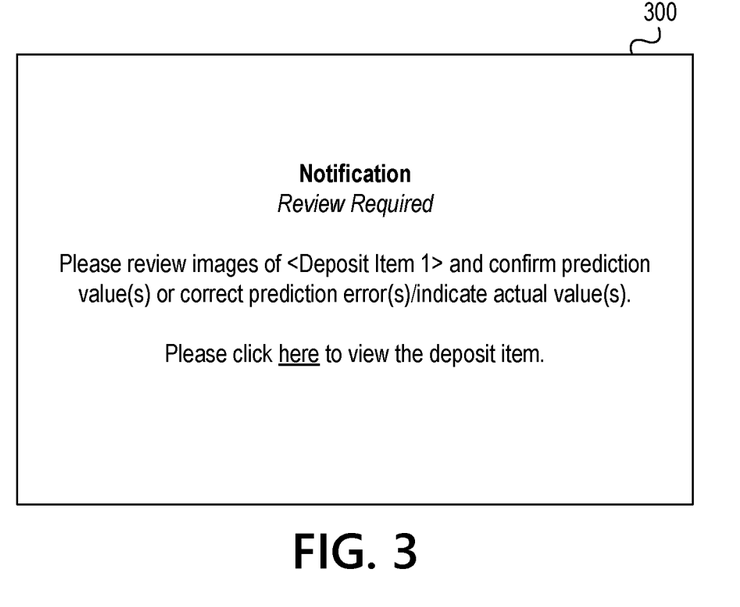
FIGS. 3 and 4 depict example graphical user interfaces for performing enhanced deposit item processing using cognitive automation tools in accordance with one or more example embodiments.

At step 206, deposit item processing computing platform 110 may receive key input from enterprise user computing device 140. For example, at step 206, after sending the one or more commands directing the first deposit item input support server (e.g., deposit item input support server 120) to accept or reject the first deposit item, deposit item processing computing platform 110 may receive, via the communication interface (e.g., communication interface 113), from an enterprise user computing device (e.g., enterprise user computing device 140), key input indicating one or more actual values for the one or more fields of the first deposit item. This key input may, for instance, be used by deposit item processing computing platform 110 to label and/or validate the prediction results of the machine learning model and/or other cognitive automation tools applied in the examples above (e.g., based on a manual review of the deposit item conducted by the user of enterprise user computing device 140). In some instances, in receiving key input from enterprise user computing device 140 at step 206, deposit item processing computing platform 110 may generate one or more user interfaces and/or cause enterprise user computing device 140 to display one or more user interfaces similar to graphical user interface 300, which is illustrated in FIG. 3. As seen in FIG. 3, graphical user interface 300 may include text and/or other content prompting a user of enterprise user computing device 140 to review a deposit item and/or a decision on the deposit item determined by deposit item processing computing platform 110 (e.g., "Please review images of <Deposit Item 1> and confirm prediction value(s) or correct prediction error(s)/indicate actual value(s). Please click here to view the deposit item.").

At step 207, deposit item processing computing platform 110 may update the cognitive automation model. For example, at step 207, deposit item processing computing platform 110 may update the machine learning classification model based on the key input indicating the one or more actual values for the one or more fields of the first deposit item. For instance, deposit item processing computing platform 110 may update the machine learning classification model based on the key input received from enterprise user computing device 140 at step 206 (e.g., be re-training and/or otherwise modifying the model to conform to the key input).

At step 208, deposit item processing computing platform 110 may receive second image data from deposit item input support server 130. For example, at step 208, deposit item processing computing platform 110 may receive, via the communication interface (e.g., communication interface 113), from a second deposit item input support server (e.g., deposit item input support server 130), second image data associated with a second deposit item. Additionally, the second deposit item input support server (e.g., deposit item input support server 130) may process deposit items presented for deposit via a different channel than the first deposit item input support server (e.g., deposit item input support server 120). For example, deposit item input support server 130 may be associated with a different channel (e.g., a mobile banking channel) than deposit item input support server 120 (which may, e.g., be associated with a financial center channel and/or an ATM channel). In some instances, the second deposit item may be received from client computing device 160 via a mobile deposit channel supported by deposit item input support server 130. Additionally or alternatively, the second image data associated with the second deposit item may be received in real time (e.g., as the second deposit item is being presented for deposit, like with the first deposit item in one or more examples discussed above).

Referring to FIG. 2C, at step 209, deposit item processing computing platform 110 may apply the cognitive automation model to the second image data. For example, at step 209, deposit item processing computing platform 110 may apply the machine learning classification model to the second image data associated with the second deposit item. In addition, by applying the machine learning classification model to the second image data associated with the second deposit item, deposit item processing computing platform 110 may produce one or more predicted values for one or more fields of the second deposit item and one or more confidence scores for the one or more predicted values of the one or more fields of the second deposit item (e.g., similar to how deposit item processing computing platform 110 may produce such predicted values and confidence scores when processing the first deposit item in the examples discussed above).

At step 210, deposit item processing computing platform 110 may generate one or more commands directing deposit item input support server 130 to accept or reject the second deposit item (e.g., similar to how deposit item processing computing platform 110 may generate one or more commands directing deposit item input support server 120 to accept or reject the first deposit item in the examples discussed above). For example, at step 210, based on the one or more predicted values for the one or more fields of the second deposit item and the one or more confidence scores for the one or more predicted values of the one or more fields of the second deposit item, deposit item processing computing platform 110 may generate one or more commands directing the second deposit item input support server (e.g., deposit item input support server 130) to accept or reject the second deposit item.

Figure 4:
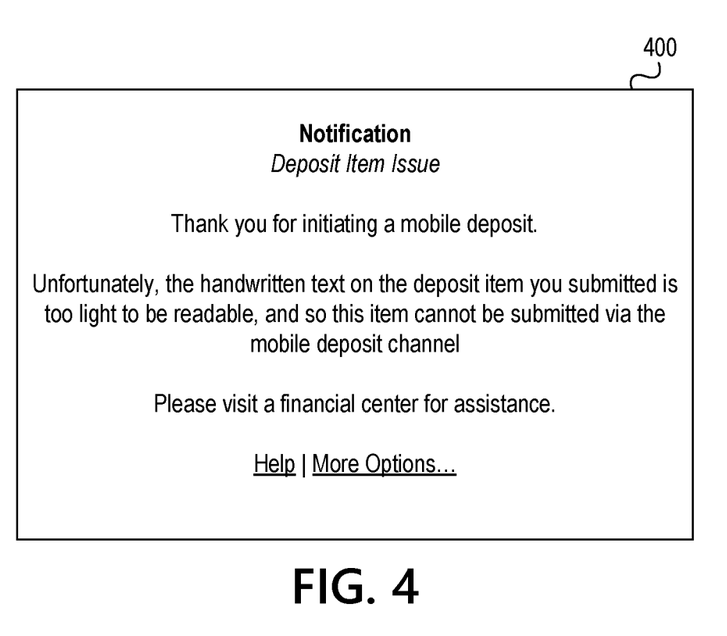

At step 211, deposit item processing computing platform 110 may send the one or more commands directing deposit item input support server 130 to accept or reject the second deposit item. For example, at step 211, deposit item processing computing platform 110 may send, via the communication interface (e.g., communication interface 113), to the second deposit item input support server (e.g., deposit item input support server 130), the one or more commands directing the second deposit item input support server (e.g., deposit item input support server 130) to accept or reject the second deposit item. In addition, by sending the one or more commands directing the second deposit item input support server (e.g., deposit item input support server 130) to accept or reject the second deposit item, deposit item processing computing platform 110 may cause the second deposit item input support server (e.g., deposit item input support server 130) to accept or reject the second deposit item. In instances where the second deposit item is being presented for mobile deposit via client computing device 160 and deposit item input support server 130, deposit item processing computing platform 110 may, for example, cause client computing device 160 to display and/or otherwise present a user interface similar to graphical user interface 400, which is illustrated in FIG. 4. As seen in FIG. 4, graphical user interface 400 may include text and/or other information associated with a decision generated by deposit item processing computing platform 110 (e.g., "Thank you for initiating a mobile deposit. Unfortunately, the handwritten text on the deposit item you submitted is too light to be readable, and so this item cannot be submitted via the mobile deposit channel Please visit a financial center for assistance.").

At step 212, deposit item processing computing platform 110 may send one or more reports to administrative computing device 150. For example, at step 212, deposit item processing computing platform 110 may send one or more reports to administrative computing device 150 indicating a current configuration of the cognitive automation model, status information associated with one or more deposit items that were accepted, rejected, and/or otherwise processed by deposit item processing computing platform 110, confidence values, thresholds, and/or other features used by deposit item processing computing platform 110 in processing deposit items, and/or other information.

Figure 5:
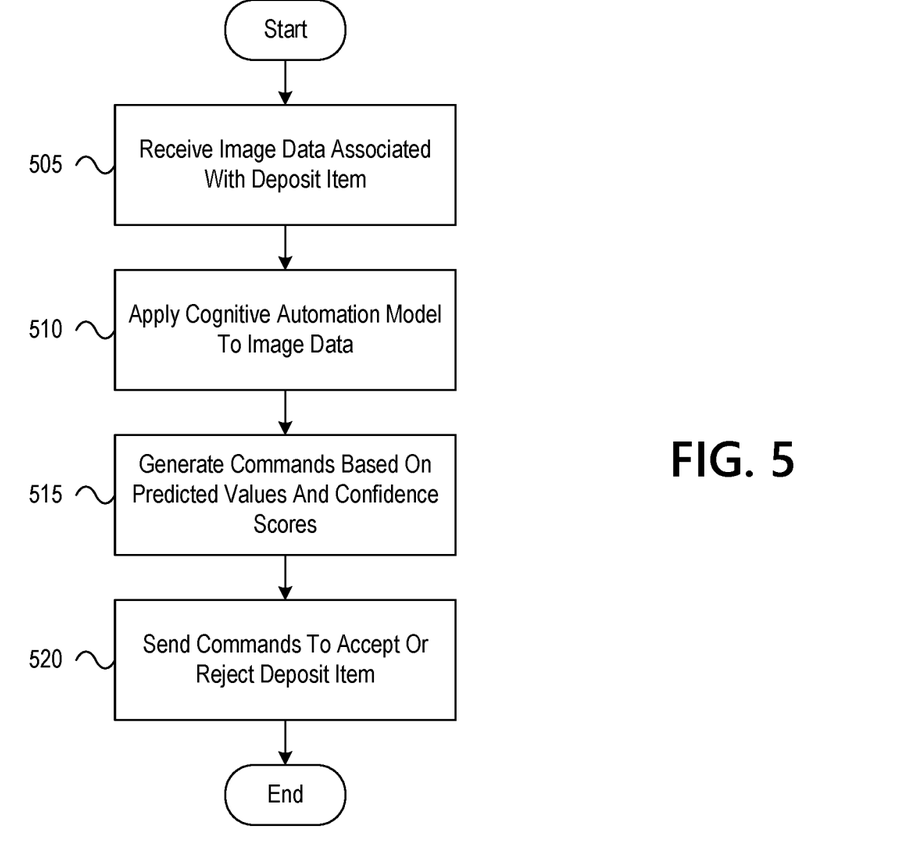
FIG. 5 depicts an illustrative method for performing enhanced deposit item processing using cognitive automation tools in accordance with one or more example embodiments.

FIG. 5 depicts an illustrative method for performing enhanced deposit item processing using cognitive automation tools in accordance with one or more example embodiments. Referring to FIG. 5, at step 505, a computing platform having at least one processor, a communication interface, and memory may receive, via the communication interface, from a first deposit item input support server, first image data associated with a first deposit item. At step 510, the computing platform may apply a machine learning classification model to the first image data associated with the first deposit item, where applying the machine learning classification model to the first image data associated with the first deposit item produces one or more predicted values for one or more fields of the first deposit item and one or more confidence scores for the one or more predicted values. At step 515, based on the one or more predicted values for the one or more fields of the first deposit item and the one or more confidence scores for the one or more predicted values, the computing platform may generate one or more commands directing the first deposit item input support server to accept or reject the first deposit item. At step 520, the computing platform may send, via the communication interface, to the first deposit item input support server, the one or more commands directing the first deposit item input support server to accept or reject the first deposit item, where sending the one or more commands directing the first deposit item input support server to accept or reject the first deposit item causes the first deposit item input support server to accept or reject the first deposit item.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computer system, comprising:
   at least one processor;
   a communication interface communicatively coupled to the at least one processor; and
   memory storing computer-readable instructions that, when executed by the at least one processor, cause the computer system to:
   receive, via the communication interface, from a first deposit item input support server, first image data associated with a first deposit item;
   apply a machine learning classification model to the first image data associated with the first deposit item, wherein applying the machine learning classification model to the first image data associated with the first deposit item produces one or more predicted values for one or more fields of the first deposit item and one or more confidence scores for the one or more predicted values;
   based on the one or more predicted values for the one or more fields of the first deposit item and the one or more confidence scores for the one or more predicted values, generate one or more commands directing the first deposit item input support server to accept or reject the first deposit item, wherein generating the one or more commands directing the first deposit item input support server to accept or reject the first deposit item comprises:
   generating a valid-invalid decision for the first deposit item based on the one or more confidence scores for the one or more predicted values and one or more confidence thresholds corresponding to the one or more predicted values; and
   embedding the valid-invalid decision generated for the first deposit item in the one or more commands directing the first deposit item input support server to accept or reject the first deposit item, wherein the valid-invalid decision generated for the first deposit item causes the first deposit item input support server to accept the first deposit item if the valid-invalid decision generated for the first deposit item comprises an indication that the first deposit item is validly presented for deposit, and wherein the valid-invalid decision generated for the first deposit item causes the first deposit item input support server to reject the first deposit item if the valid-invalid decision generated for the first deposit item comprises an indication that the first deposit item is not validly presented for deposit; and send, via the communication interface, to the first deposit item input support server, the one or more commands directing the first deposit item input support server to accept or reject the first deposit item, wherein sending the one or more commands directing the first deposit item input support server to accept or reject the first deposit item causes the first deposit item input support server to accept or reject the first deposit item, wherein the memory stores additional computer-readable instructions that, when executed by the at least one processor, cause the computer system to:

prior to receiving the first image data associated with the first deposit item, train the machine learning classification model based on a labeled dataset comprising images of previously submitted deposit items and decision data corresponding to the images of the previously submitted deposit items indicating whether each of the previously submitted deposit items was validly presented for deposit or not validly presented for deposit, the images of the previously submitted items including items that were validly presented for deposit and items that were not validly presented for deposit;

after sending the one or more commands directing the first deposit item input support server to accept or reject the first deposit item, receive, via the communication interface, from an enterprise user computing device, key input indicating one or more actual values for the one or more fields of the first deposit item; and update the machine learning classification model based on the key input indicating the one or more actual values for the one or more fields of the first deposit item.

2. The computer system of claim 1, wherein receiving the first image data associated with the first deposit item from the first deposit item input support server comprises receiving the first image data associated with the first deposit item from the first deposit item input support server in real time as the first deposit item is presented for deposit.

3. The computer system of claim 1, wherein receiving the first image data associated with the first deposit item from the first deposit item input support server comprises receiving image data comprising handwritten text.

4. The computer system of claim 3, wherein receiving the first image data associated with the first deposit item from the first deposit item input support server comprises parsing the handwritten text using one or more computer vision models.

5. The computer system of claim 1, wherein applying the machine learning classification model to the first image data associated with the first deposit item produces a predicted value for a legal amount of the first deposit item and a confidence score for the predicted value for the legal amount of the first deposit item.

6. The computer system of claim 1, wherein applying the machine learning classification model to the first image data associated with the first deposit item produces a predicted value for a convenience box amount of the first deposit item and a confidence score for the predicted value for the convenience box amount of the first deposit item.

7. The computer system of claim 1, wherein applying the machine learning classification model to the first image data associated with the first deposit item produces a predicted value for a payee field of the first deposit item.

8. The computer system of claim 1, wherein applying the machine learning classification model to the first image data associated with the first deposit item produces a predicted value for a date field of the first deposit item.

9. The computer system of claim 1, wherein applying the machine learning classification model to the first image data associated with the first deposit item produces a predicted value for a signature field of the first deposit item.

10. The computer system of claim 1, wherein applying the machine learning classification model to the first image data associated with the first deposit item produces a predicted value for an endorsement field of the first deposit item.

11. The computer system of claim 1, wherein applying the machine learning classification model to the first image data associated with the first deposit item produces a predicted value for a magnetic ink character recognition (MICR) line field of the first deposit item.

12. The computer system of claim 1, wherein the memory stores additional computer-readable instructions that, when executed by the at least one processor, cause the computer system to:

receive, via the communication interface, from a second deposit item input support server, second image data associated with a second deposit item, wherein the second deposit item input support server processes deposit items presented for deposit via a different channel than the first deposit item input support server;

apply the machine learning classification model to the second image data associated with the second deposit item, wherein applying the machine learning classification model to the second image data associated with the second deposit item produces one or more predicted values for one or more fields of the second deposit item and one or more confidence scores for the one or more predicted values of the one or more fields of the second deposit item;

based on the one or more predicted values for the one or more fields of the second deposit item and the one or more confidence scores for the one or more predicted values of the one or more fields of the second deposit item, generate one or more commands directing the second deposit item input support server to accept or reject the second deposit item; and send, via the communication interface, to the second deposit item input support server, the one or more commands directing the second deposit item input support server to accept or reject the second deposit item, wherein sending the one or more commands directing the second deposit item input support server to accept or reject the second deposit item causes the second deposit item input support server to accept or reject the second deposit item.

13. A method, comprising:
at a computer system comprising at least one processor, a communication interface, and memory:

receiving, by the at least one processor, via the communication interface, from a first deposit item input support server, first image data associated with a first deposit item;

applying, by the at least one processor, a machine learning classification model to the first image data associated with the first deposit item, wherein applying the machine learning classification model to the first image data associated with the first deposit item produces one or more predicted values for one or more fields of the first deposit item and one or more confidence scores for the one or more predicted values;

based on the one or more predicted values for the one or more fields of the first deposit item and the one or more confidence scores for the one or more predicted values, generating, by the at least one processor, one or more commands directing the first deposit item input support server to accept or reject the first deposit item, wherein generating the one or more commands directing the first deposit item input support server to accept or reject the first deposit item comprises:

generating a valid-invalid decision for the first deposit item based on the one or more confidence scores for the one or more predicted values and one or more confidence thresholds corresponding to the one or more predicted values; and embedding the valid-invalid decision generated for the first deposit item in the one or more commands directing the first deposit item input support server to accept or reject the first deposit item, wherein the valid-invalid decision generated for the first deposit item causes the first deposit item input support server to accept the first deposit item if the valid-invalid decision generated for the first deposit item comprises an indication that the first deposit item is validly presented for deposit, and wherein the valid-invalid decision generated for the first deposit item causes the first deposit item input support server to reject the first deposit item if the valid-invalid decision generated for the first deposit item comprises an indication that the first deposit item is not validly presented for deposit; and sending, by the at least one processor, via the communication interface, to the first deposit item input support server, the one or more commands directing the first deposit item input support server to accept or reject the first deposit item, wherein sending the one or more commands directing the first deposit item input support server to accept or reject the first deposit item causes the first deposit item input support server to accept or reject the first deposit item, wherein the method further comprises:

prior to receiving the first image data associated with the first deposit item, training, by the at least one processor, the machine learning classification model based on a labeled dataset comprising images of previously submitted deposit items and decision data corresponding to the images of the previously submitted deposit items indicating whether each of the previously submitted deposit items was validly presented for deposit or not validly presented for deposit, the images of the previously submitted items including items that were validly presented for deposit and items that were not validly presented for deposit;

after sending the one or more commands directing the first deposit item input support server to accept or reject the first deposit item, receiving, by the at least one processor, via the communication interface, from an enterprise user computing device, key input indicating one or more actual values for the one or more fields of the first deposit item; and updating, by the at least one processor, the machine learning classification model based on the key input indicating the one or more actual values for the one or more fields of the first deposit item.

14. The method of claim 13, wherein receiving the first image data associated with the first deposit item from the first deposit item input support server comprises receiving the first image data associated with the first deposit item from the first deposit item input support server in real time as the first deposit item is presented for deposit.

15. The method of claim 13, wherein receiving the first image data associated with the first deposit item from the first deposit item input support server comprises receiving image data comprising handwritten text.

16. The method of claim 15, wherein receiving the first image data associated with the first deposit item from the first deposit item input support server comprises parsing the handwritten text using one or more computer vision models.

17. One or more non-transitory computer-readable media storing instructions that, when executed by a computer system comprising at least one processor, a communication interface, and memory, cause the computer system to:

receive, via the communication interface, from a first deposit item input support server, first image data associated with a first deposit item;

apply a machine learning classification model to the first image data associated with the first deposit item, wherein applying the machine learning classification model to the first image data associated with the first deposit item produces one or more predicted values for one or more fields of the first deposit item and one or more confidence scores for the one or more predicted values;

based on the one or more predicted values for the one or more fields of the first deposit item and the one or more confidence scores for the one or more predicted values, generate one or more commands directing the first deposit item input support server to accept or reject the first deposit item, wherein generating the one or more commands directing the first deposit item input server to accept or reject the first deposit item comprises:

generating a valid-invalid decision for the first deposit item based on the one or more confidence scores for the one or more predicted values and one or more confidence thresholds corresponding to the one or more predicted values; and embedding the valid-invalid decision generated for the first deposit item in the one or more commands directing the first deposit item input support server to accept or reject the first deposit item, wherein the valid-invalid decision generated for the first deposit item causes the first deposit item input support server to accept the first deposit item if the valid-invalid decision generated for the first deposit item comprises an indication that the first deposit item is validly presented for deposit, and wherein the valid-invalid decision generated for the first deposit item causes the first deposit item input support server to reject the first deposit item if the valid-invalid decision generated for the first deposit item comprises an indication that the first deposit item is not validly presented for deposit; and send, via the communication interface, to the first deposit item input support server, the one or more commands directing the first deposit item input support server to accept or reject the first deposit item, wherein sending the one or more commands directing the first deposit item input support server to accept or reject the first deposit item causes the first deposit item input support server to accept or reject the first deposit item, wherein the one or more non-transitory computer-readable media store additional instructions that, when executed, cause the computer system to:

prior to receiving the first image data associated with the first deposit item, train the machine learning classification model based on a labeled dataset comprising images of previously submitted deposit items and decision data corresponding to the images of the previously submitted deposit items indicating whether each of the previously submitted deposit items was validly presented for deposit or not validly presented for deposit, the images of the previously submitted items including items that were validly presented for deposit and items that were not validly presented for deposit;

after sending the one or more commands directing the first deposit item input support server to accept or reject the first deposit item, receive, via the communication interface, from an enterprise user computing device, key input indicating one or more actual values for the one or more fields of the first deposit item; and update the machine learning classification model based on the key input indicating the one or more actual values for the one or more fields of the first deposit item.

\* \* \* \* \*